United States Patent [19]

Gargiulo et al.

[11] Patent Number: 4,935,961

[45] Date of Patent: Jun. 19, 1990

[54] METHOD AND APPARATUS FOR THE GENERATION AND SYNCHRONIZATION OF CRYPTOGRAPHIC KEYS

[76] Inventors: Joseph L. Gargiulo, 5418 Main St., Trumbull, Conn. 06611; Jose Pastor, 191 Wilton Rd., Westport, Conn. 06880

[21] Appl. No.: 224,619

[22] Filed: Jul. 27, 1988

[51] Int. Cl.$^5$ .............................................. H04L 9/08
[52] U.S. Cl. ....................................... 380/21; 380/29; 380/44; 380/45; 380/48; 380/49
[58] Field of Search ........................ 380/21, 28, 29, 36, 380/43, 44, 45, 48, 49

[56] References Cited

U.S. PATENT DOCUMENTS

| | | |
|---|---|---|
| 3,958,081 | 5/1976 | Ehrsam et al. |
| 3,962,539 | 6/1976 | Ehrsam et al. |
| 4,004,089 | 1/1977 | Richard et al. |
| 4,160,120 | 7/1979 | Barnes et al. |
| 4,172,213 | 10/1979 | Barnes et al. |
| 4,193,131 | 3/1980 | Lennon et al. ............................ 375/2 |
| 4,295,039 | 10/1981 | Stuckert .............................. 235/380 |
| 4,369,332 | 1/1983 | Campbell, Jr. |
| 4,393,269 | 7/1983 | Konheim et al. |
| 4,423,287 | 12/1983 | Zeidler |
| 4,438,824 | 3/1984 | Mueller-Schloer |
| 4,458,109 | 7/1984 | Mueller-Schloer |
| 4,531,020 | 7/1985 | Wechselberger et al. |
| 4,578,530 | 3/1986 | Ziedler |
| 4,578,531 | 3/1986 | Everhart et al. |
| 4,588,991 | 5/1986 | Atalla ............................... 340/825.31 |
| 4,590,470 | 5/1986 | Koenig ............................. 340/825.31 |
| 4,601,011 | 7/1986 | Grynberg ............................. 364/900 |
| 4,605,820 | 7/1986 | Campbell, Jr. |
| 4,607,137 | 8/1986 | Jansen et al. |
| 4,630,201 | 12/1986 | White .................................. 364/408 |
| 4,649,233 | 3/1987 | Bass et al. ............................... 380/21 |
| 4,723,284 | 2/1988 | Munck et al. ............................ 380/25 |
| 4,731,840 | 3/1988 | Mniszewski et al. ................. 380/21 |
| 4,776,011 | 10/1988 | Busby .................................... 380/37 |

OTHER PUBLICATIONS

D. Coppersmith, IBM J. Res. Develop., 2-87, pp. 244-248.

Primary Examiner—Thomas H. Tarcza
Assistant Examiner—Linda J. Wallace
Attorney, Agent, or Firm—Robert H. Whisker; Melvin J. Scolnik; David E. Pitchenik

[57] ABSTRACT

A method and apparatus for generating cryptographic keys for a postal manifest and for synchronizing cryptographic keys for transmitting postal data securely on a communication link is presented. The techniques for generating a key and for synchronizing keys use the same apparatus but use slightly different data to create a cryptographic key.

The postal data center maintains a unique set of data for each server station. Using this set of data along with a manifest sequence number (or communication transaction number) and the date, a cryptographic key is created. Each server station stores a fixed master key, KO, a permutation table, Pt, and ID, and GMT date. Using the manifest sequence number (or the communication transaction number) a row of the permutation table is altered and the master key KO is scrambled with the permutation table top get a new key K2. With K2, the date, server ID, and manifest sequence number (our communication transaction number) are encrypted. The result of this encryption yields another key K3. K3 is then used for encrypting the postal manifest or for communicating with a postal data center.

20 Claims, 5 Drawing Sheets

METHOD AND APPARATUS FOR THE GENERATION AND SYNCHRONIZATION OF CRYPTOGRAPHIC KEYS

This invention relates to the synchronization of cryptographic keys generated at two or more locations without the necessity of passing information between the two locations that could lead to unauthorized determination of the cryptographic keys generated at the locations. While the invention is especially adapted to, and will be specifically disclosed herein, with respect to the provision of a method and apparatus for synchronizing and/or resynchronizing the generation of identical cryptographic keys at the server station and data center of a postal system adapted to monitor the mailing of batch mail, it will be apparent that the invention is not limited to this application.

A server is a mailing machine, for example, for making batch mail, wherein a batch of mail is assembled with a manifest, which serves to identify the contents of the batch to the post office. The manifest has imprinted thereon 20 information such as the quantities of different classes of mail in the batch, etc. In addition, the manifest carries an encrypted verification number to enable the post office to verify the manifest and its accuracy. Each server has an identification number ID (which may be alphanumeric), and the batches assembled by each server are identified by sequential run number T. The ID and run number are printed on the manifest, as well as the date that the manifest was issued.

The system further includes a data center operated, for example, by the Assignee of the present application, that maintains information concerning each server, so that the post office can call the data center to verify each batch that it receives on the basis of information printed on the accompanying manifest.

A problem involved in such a system arises in the difficulty of maintaining cryptographic keys used in the encryption and decryption of the manifest data. While the manifest keys, and the identity of the corresponding servers, may be stored directly at the data center, this technique is cumbersome and requires the storing of an extremely large number of keys at the data center, while still not permitting simple modifications of the keys for increasing the security of the system.

Another problem involved in such a system is securely communicating information between the data center and the server across a data link. To keep this information secure, it is encrypted using the Data Encryption Standard (DES) with a cryptographic key stored by both the data center and server. A further problem arises in initializing the key (for the first time) and secondly, changing the key periodically to increase security. Sending the key across the data link is not acceptable since it could be intercepted and all future transmissions could be decrypted by an information thief.

This second problem is solved by passing a "change key" message across the communication link and employing the technique presented here to create a key on both sides of the link (synchronizing their keys) using Greenwich Mean Time (GMT) date and information contained in the server and data center. Hence, with this technique, the data center and server can synchronize their cryptographic keys without sending critical information across the link.

In accordance with the invention, the data center and server each store an identical 32 bit master key. Remote recharging postage systems conventionally employ a master key of 64 bits, 32 bits of which are fixed and 32 bits of which vary in accordance with certain rules. In order to be compatible with such remote recharging systems, the 32 bit master key of the invention preferably corresponds to the 32 fixed bits of the master key of a remote recharging system. There is no need, however, for the invention to be used in conjunction with such postage recharging systems.

The master key of each server is unique to that server. Since the data center may service a large number of servers, the data center must store the correspondence between the ID of each server and its master key. Thus, upon being informed of an ID, the data center can retrieve the corresponding master keY.

The server and data center each include a real time clock, so that the time of issue of the manifest can be determined. This clock preferably outputs the time as GMT, so that the issue time and date is independent of the location of the server.

The server and the data center each also have stored therein a C column by N row permutation table, wherein C is an integer corresponding to the bit length of the fixed master key and N is an integer of arbitrary length. This permutation table (which may be unique to the server) is used to derive a string $K_1$ from the master key $K_0$ of corresponding length. The row of the table that is used for calculation at any time is a function of the transaction number. Each row of the table has a number from 1 to 32 stored at each column, each column corresponding to a bit position of the master key $K_0$. The string $K_1$ derived from the permutation table is thus a string of 0's and 1's corresponding to the data at the bit positions of the master key $K_0$ as identified sequentially by the numbers stored sequentially in the columns of the row of the permutation table corresponding to the current transaction number. The total number of rows N is selected to enable the use of the table for a time commensurate with the expected usage of the table. Preferably the table is not stored as a complete table but in algorithmic form. Thus, preferably data corresponding to one row of the table is stored, along with a secure algorithm for the development of a modified row corresponding to the current transaction number. Storage in this manner provides increased security since the full permutation table is not readily identifiable by examination of the memory. Applicants note that references to selection of a row of the permutation table in accordance with the transaction number and permutation of the master key accordingly are logically equivalent to references to generation of a particular permutation in accordance with an algorithm based on the transaction number and permutation of the master key accordingly, and that such logically equivalent selection is preferred as providing increased security against direct examination of the system memory.

If the master string is shorter than 64 bits, e.g. 32 bits, the server and data center may further include a growth table for expanding the string $K_1$ to a 64 bit string $K_2$. This expansion is necessary for compatibility of the key with conventional DES encoding techniques. This table may be a list of 64 numbers, each of the numbers being from 1 to 32 and corresponding sequentially to the bit positions of the 64 bit string $K_2$. Each bit of the 64 bit string $K_2$ is a 0 or 1, depending on the data at the bit position of the 32 bit string $K_1$ identified by the number in the list.

In accordance with the invention, identical encryption keys can be generated at the server and the data center without the necessity of communication of encryption information between the server and data center, in the following manner.

1. The server determines the row of its permutation table to be used in the calculation, on the basis of the run number. The row to be used may correspond directly to the transaction number.

2. Using the selected row, the server develops a 32 bit string $K_1$ from the permutation table and the master key $K_0$, assuming that the master key was a 32 bit key.

3. Using the growth table, the server develops a 64 bit string $K_2$ from the 32 bit string $K_1$, and, if necessary, adjusts for parity.

4. The server now encrypts the date from its clock, its ID number, and the run number, with the 64 bit string $K_2$, to produce a 64 bit encryption key $K_3$. The encryption may employ the data encryption standard DES.

5. The encryption key $K_3$ may be adjusted for parity. Those skilled in the art will recognize that the DES standard DES encryption algorithm treats one bit in every byte of the received key as a parity bit and makes actual use of only 56 bits of the key for encryption. Accordingly by "adjusted for parity herein" is meant setting the eighth bit in every byte of the key in accordance with a preselected odd or even parity.

6. The data center receives the ID number and the run number, which are printed in plain text on the manifest, selects the appropriate master key $K_0$ and permutation table for the identified server, and duplicates steps two through five.

In order that the invention may be more clearly understood, it will now be disclosed in greater detail with reference to the accompanying drawings, wherein.

Figure 1:
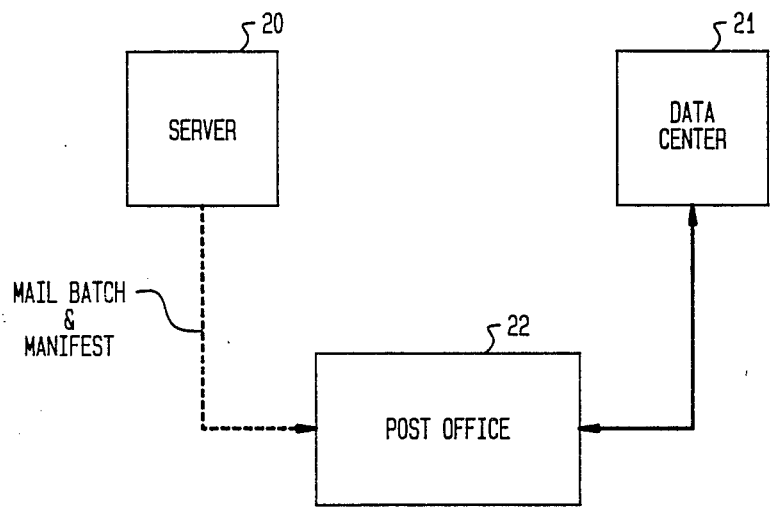
FIG. 1 is a simplified block diagram of a system for monitoring the mailing of batch mail.
Figure 2:
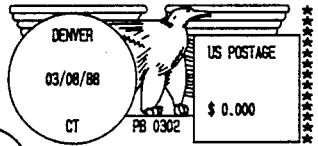
FIG. 2 is an example of manifest that may accompany a batch of mail.

Referring now to the drawings, and in particular to FIG. 1, therein is illustrated a postal system including a server 20, a data center 21 and a post office 22. The server 20 is provided with facilities for batch mailing, wherein a batch of mail to be mailed is forwarded to the post office 22, along with a manifest providing detail of the contents of the batch, e.g. the totals of different types of mail and different classes of mail, and postage required for the mailing of the batch. In order to verify the manifest, the manifest has imprinted thereon an encrypted number which, when decoded, should verify the various data imprinted on the manifest. A typical manifest for this purpose is illustrated in FIG. 2, wherein a block 23 of characters represents an encryption of various data on the manifest. The manifest further includes an identification number 24 of the server, the data of issue 25 of the manifest, and the run number 26, i.e. the sequential number of the current batch in a series of batch mailings by the server.

Upon receipt of the batch and corresponding manifest, the post office, in normal procedure, communicates with the data center 21, which may be a commercial organization such as the assignee of the present application, and advises the data center of the identity of the server that issued the manifest and the manifest run number as well as a portion 23a of the block 23 of the encrypted numbers. The data center incorporates encryption/decryption programs and data, the same as employed by the server, and upon receipt from the post office of the identification of the server and the run number can regenerate further information appearing on the manifest, or upon receipt of such further information, can regenerate the encrypted numbers. If necessary, upon receipt of the entire block of encrypted numbers, the data center can regenerate for the post office all of the data on the manifest that has been encrypted, for verification purposes.

Further data on the manifest is of a conventional nature, and need not be discussed herein. With respect to the data center, it is of course apparent that it is necessary for the data center to maintain a record of the various keys, tables, etc. employed by each of the servers associated therewith, so that upon receipt of the identification of a server and the transaction number, the pertinent material for encryption and decryption is available for use.

Figure 3:
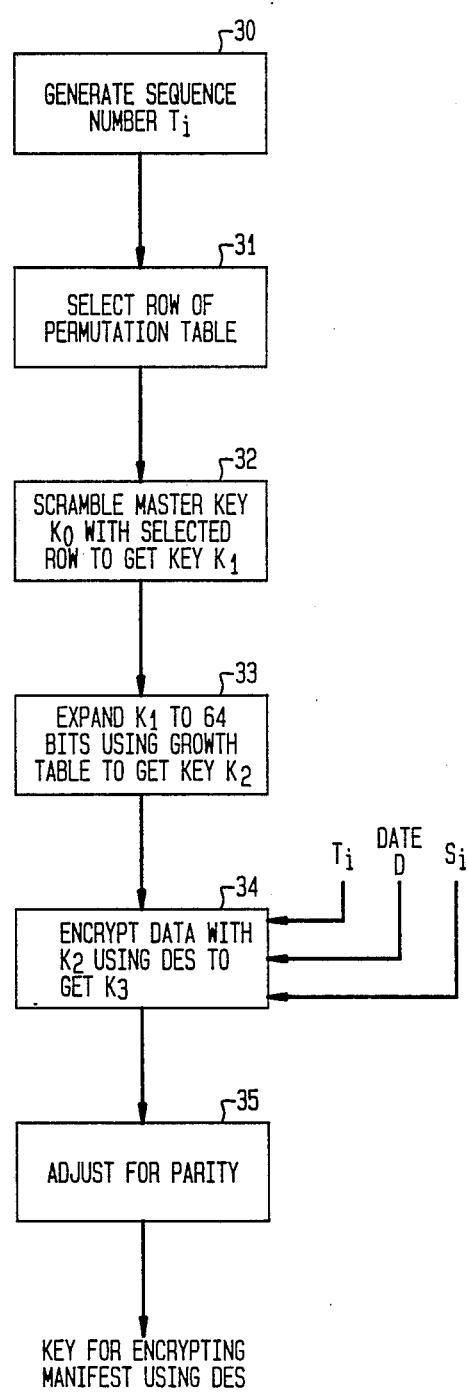
FIG. 3 is a flow diagram illustrating the generation of a cryptographic key in accordance with the invention.

FIG. 3 illustrates a flow diagram showing the generation of a key in accordance with the invention for use in an encryption or decryption process. In accordance with the invention, at block 30, a sequence number $T_i$ is generated in order to determine the row number of the permutation table that is to be employed in a given encryption or decryption. When the number $T_i$ is determined at the server, this step may constitute the stepping of a counter to access the next available row of the permutation table stored therein. When the number $T_i$ is to be employed at the data center, it may be transmitted thereto from the post office upon inspection of a manifest. This communication may be oral, as desired.

After determination of the sequence number, the row of the permutation table corresponding thereto is selected, at block 31. The master key $K_0$ is then scrambled in accordance with the selected row of the table, to get the key $K_1$, as indicated at block 32. If it is necessary to expand the key $K_1$ to render it adaptable for use with an encryption standard such as DES, the key $K_1$ is expanded by the use of a growth table, at block 33, to produce the key $K_2$. In order that the final key $K_3$ be continually varied, one or more data inputs such as the sequence number $T_i$ and/or the date D, and/or the identification number $S_i$ of the server, are encrypted by the $K_2$, employing DES. This result $K_2$ is then adjusted for parity at block 35 to produce the key $K_3$ for encrypting the required data on the manifest, employing for example the DES.

Figure 4:
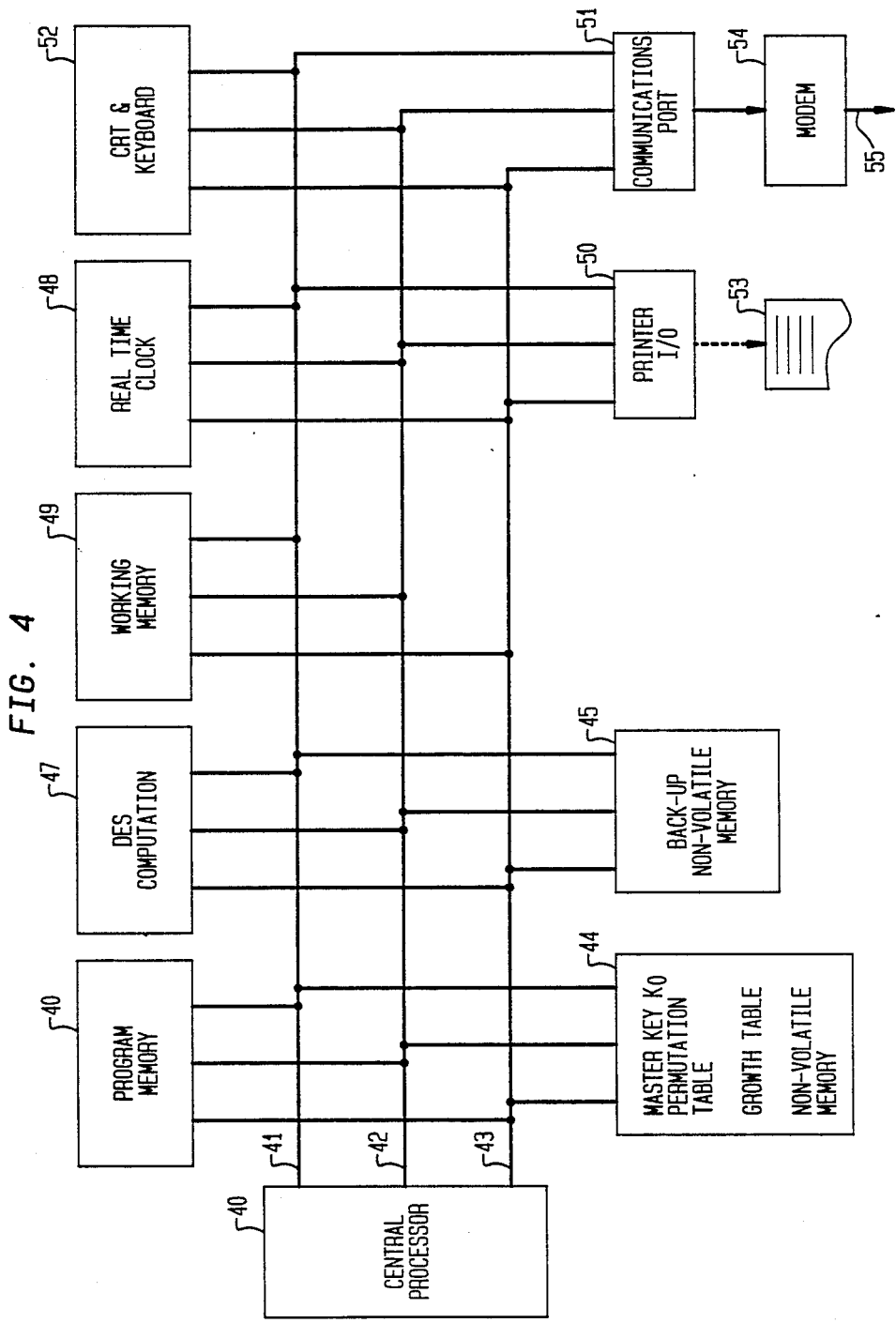
FIG. 4 is a block diagram of a system that may be employed at the server and/or the data center of a postal system for the generation of a cryptographic key, in accordance with the invention.

A suitable system for generating a key, in accordance with the invention, is illustrated in FIG. 4. While this system is especially adapted for use in a server, it will be apparent that conceptually the blocks thereof are also adaptable for application to the data center. The system incorporates a central processor 40 of conventional construction, for example, a microcomputer having address, data and control buses 41, 42 and 43 respectivelY. A nonvolatile memory 44 stores the master key $K_0$, a permutation table $P_C$, and a growth table $G_T$.

Preferably the table $P_C$ may be stored in the form of an initial row and a simple, secure algorithm, based on the transaction number, to generate further rows of the table so that the memory 44 need not store the full permutation table. The particular algorithm selected to generate the successive rows of the permutation table is not critical to the subject invention, so long as it is kept secure. For example, it may consist of no more than the successive interchange of pairs of elements in successively generated rows, the pairs being selected in accordance with the transaction number. This technique minimizes the memory space required for the permutation table. In addition, a further memory 45 may be provided as a back-up for the memory 44.

The memory 46 stores the program for generation of the key, in accordance with the invention, and the sub-system 47 may comprise a chip for effecting DES encryption and decryption. For example, an Advanced Micro Device chip AMD Z8068, or a Motorola chip MC 6859 may be provided for this purpose. DES decryption is discussed for example, in FIPS The system of FIG. 4 further includes a real time clock 48 providing an output of the date based upon GMT time. In addition, the central processor is connected to a working memory 49, a printer I/O 50, communication port 51, and a CRT and keyboard 53 to enable manual input and output to the micro-computer, as well as display of the operation of the system. The printer I/0 50 is coupled to a printer 53 for printing the manifest, and the communications port 51 may be connected to a modem 54, to enable communication between the server and other device, such as the data center via a communication link 55.

Figure 5:
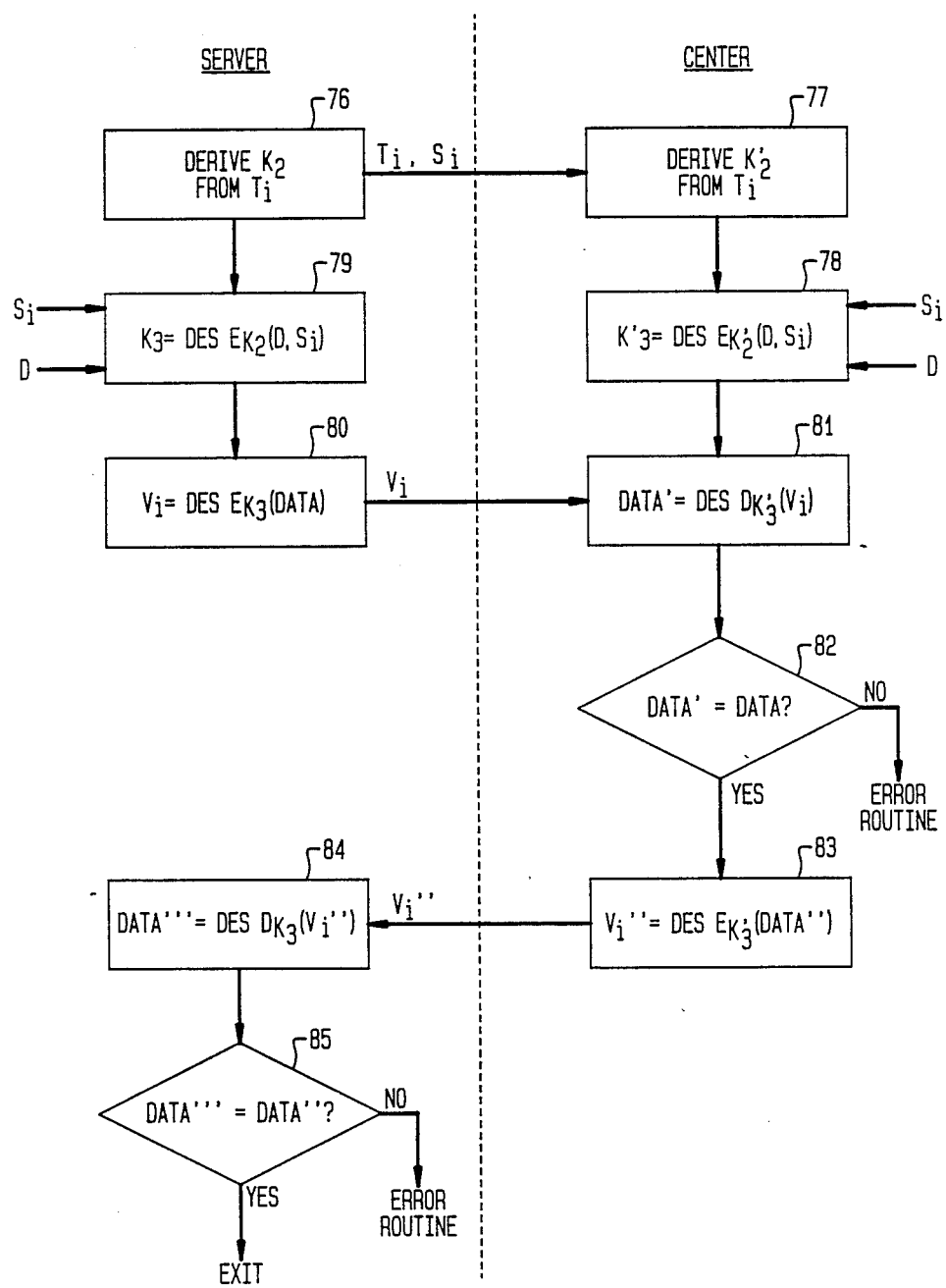
FIG. 5 is a flow diagram illustrating a method for checking the accuracy of the generation of identical cryptographic keys at two stations.

On occasion, it may be necessary to verify that identical codes are being generated by the server and the data center. A program for effecting such verification is illustrated in FIG. 5, wherein steps may be effected externally of the server and data center, and do not directly form a part of the present invention. As illustrated, based on a selected transaction number $T_i$ at 76 the server generates a key $K_2$ in the manner described above, and based upon the same transaction number, at 77 the data center generates a key $K'_2$ in the same manner. (As used herein "transaction numbers" identify particular communications between a server and the data center. It will be recognized that transaction numbers are used equivalently to "run numbers" to generate keys.) At 79 and 78 respectively the keys $K_2$ and $K'_2$ are employed to encrypt the date D and server number $S_i$ employing DES to generate keys $K_3$ and $K'_3$. A message $V_i$ is generated by encrypting predetermined DATA at 80 with key $K_3$. $V_i$ is transmitted to the center and decrypted using key $K'_3$ at 81. A communication link, as shown in FIG. 5, may be employed for transmitting the transaction number $T_i$ server ID, $S_i$ and encrypted data $V_i$ from the server to the data center. The decryption of message $V_i$, DATA', is then compared at block 82 with the predetermined DATA, which is also stored in the center. If a comparison does not exist, an error has occurred and a request may be made to re-check the calculations. If a comparison is made, then predetermined DATA" (which may be equal to DATA) is encrypted with the use of the key $K'_3$ at block 83 to generate encrypted message $V_i''$ and passed via a communication link for decryption in a DES decryption step at the server at 84 employing the key $K_3$. The result is compared with the DATA' stored at the server at block 85. If a comparison exists, then complete synchronization exists between the server and the data center.

In accordance with the subject invention, a server and data center are provided, which each include:

1. An identical master key $K_0$ stored in memory. As above discussed, this may be a 32 bit key for convenience in postal systems, or it may have any other number of bits. This key is a secure number, i.e. its identity must be maintained in the equipment or by authorized personnel in complete secrecy.

2. An identical permutation table. The permutation table, an example of which is illustrated in Table 1, has as many columns C as there are bits in the master string to be encoded, e.g. 32 in the present example. The table has an arbitrary number N of rows, the number N preferably being sufficiently large that a separate row can be provided for each transaction that can be expected in a predetermined period of usage of the device. Each row of the table contains numbers (e.g. from 1 to 32), randomly distributed from 1 through C. These numbers correspond to the bit positions of the master string to be encoded. As the term "permutation" is used herein, it is not necessary for each of the numbers from 1 to 32 to be preset in each row, and duplication of numbers is hence permissible.

When a row of the permutation table has been selected, a C bit (e.g. 32 bit) result is generated as a new string in which each bit position of the new string corresponds to the contents of the bit position of the master string addressed at the corresponding column of the permutation table.

Thus referring to the permutation table of Table 1, assuming that the row 2 has been selected, the first bit of the new 32 bit string will be the same as the bit at the third bit position of the master key, the second bit of the new 32 bit string will be the same as the bit at the 27th bit position of the master key, the bit at the third bit position of the new string will be the same as the bit at the 13th bit position of the master string, etc.

TABLE 1

| | COLUMN | | | | | | | | | | |
|---|---|---|---|---|---|---|---|---|---|---|---|
| | 1 | 2 | 3 | 4 | 5 | 6 | 7 | 8 | 9 | 10 | ... | 32 |
| 1 | 3 | 27 | 13 | 15 | 18 | 7 | 4 | 2 | 1 | 30 | ... | 5 |
| 2 | 2 | 27 | 13 | 18 | 15 | 7 | 4 | 2 | 1 | 30 | ... | 5 |
| 3 | 3 | 27 | 13 | 18 | 15 | 4 | 7 | 2 | 1 | 30 | ... | 5 |
| 4 | | | | | | | | | | | | |
| 5 | | | | | | | | | | | | |
| . | | | | | | | | | | | | |
| . | | | | | | | | | | | | |
| N | | | | | | | | | | | | |

While the permutation table may be stored in the systems in the form of a table, the invention also contemplates algorithmic storage of less information than the complete table, along with suitable algorithms for deriving the required data of any row. Thus, the first row may be stored in memory, along with an algorithm for modification of the first row in accordance with the identity of the transaction number, to derive the data of the row corresponding to the transaction number.

The particular choice of algorithm for modification of the first row is not critical and its selection is not a limitation of the subject invention. For example, as is shown in FIG. 1, selected pairs of cells may be interchanged cyclically in accordance with Ti.

3. If necessary in the system, a growth table for expanding or diminishing the number of bits of the key, from $K_1$ to $K_2$. When a master key of 32 bits is employed, for example, and it is necessary to expand the key to 64 bits for use in DES encryption, a table such as shown in Table 2 herein may be employed.

TABLE 2

| Bit Position | Bit Position Of $K_1$ From Which Data For $K_2$ Is Derived |
| --- | --- |
| 1 | 31 |
| 2 | 5 |
| 3 | 1 |
| 4 | 12 |
| 5 | 25 |
| . | . |
| . | . |
| 64 | 5 |

When a growth table as shown in Table 2 is employed, it is evident that the first bit position of $K_2$ will have the same data as that at the 31st bit position of $K_1$, the second bit position of $K_2$ will have the same data as that at the fifth bit position of $K_1$, the third bit position of $K_2$ will have the same data as that at the first bit position of $K_1$, etc.

While the invention has been disclosed and described with reference to a minimum number of embodiments, it will be apparent that variations and modifications may be made therein, and it is therefore intended in the following claims to cover each such variation and modification as falls within the true spirit and scope of the invention.

What is claimed is:

1. A method for generating encryption keys for a sequence of messages comprising the steps of:
   (a) determining a sequence of N different encryption keys;
   (b) associating a value of a sequence variable $T_i$, with each of said messages; and
   (c) selecting one of said N encryption keys as a function of said variable $T_i$ for each of said messages and encrypting at least a portion of each of said messages in accordance with an encryption key derived in a predetermined manner from the corresponding one of said selected keys; and wherein
   (d) said step of selecting one of said encryption keys produces results identical to the steps of:
      (d1) storing a fixed master key $K_o$ having C elements;
      (d2) storing a permutation table, said table having C columns and N rows, the columns of said table sequentially corresponding to the element positions of key $K_0$, the elements of said table consisting of numbers from 1 to C; and
      (d3) selecting a row $N_i$ of said table in accordance with said variable $T_i$; and
      (d4) scrambling key $K_o$ to derive an encryption key $K_1$, having C elements, by, for all of said elements of $K_1$, setting the jth element of $K_1$ equal to the yth element of $K_0$, where y is the number at column j, row $N_i$ of said permutation table, where j is an integral variable ranging from 1 to C.

2. The method of claim 1 further comprising expanding $K_1$ in a predetermined manner to derive an expanded encryption key $K_2$.

3. The method of claim 2 further comprising adjacent $K_2$ for parity.

4. The method of claim 2 further comprising modifying $K_2$ to form an encryption key $K_3$, said step of modifying comprising encryption variable data with $K_2$ to generate $K_3$.

5. The method of claim 4 wherein said step of encrypting variable data comprises encrypting a sequence dependent variable.

6. The method of claim 2 further comprising modifying $K_2$ to form an encryption key $K_3$, said step of modifying comprising encrypting variable data with $K_2$ to generate $K_3$.

7. The method of claim 6 wherein said step of encrypting variable data comprises encrypting a sequence dependent variable.

8. The method of claim 1 further comprising storing said permutation table in algorithmic form.

9. A method for synchronizing the generation of an encryption key $K_3$ at first and second stations comprising the steps of:
   (a) providing identical sequences of N different encryption keys at said first and second stations;
   (b) selecting a value for a variable $T_i$;
   (c) selecting one of said N encryption keys in accordance with said selected value and a predetermined function of said variable $T_i$ at each of said first and second stations to obtain encryption keys $K_1$ and $K'_1$ respectively;
   (d) encrypting a block of data D at said first station using an encryption key derived in a predetermined manner from said key $K_1$ to generate a message $V_1$;
   (e) providing the plain text of said block D at said second station;
   (f) transmitting said message $V_i$ from said first station to said second station;
   (g) decrypting said message $V_i$ using a key derived from said key $K'_1$ in said predetermined manner to provide a block of data D; and,
   (h) comparing said data D and data D' to verify synchronization at said second station.

10. A method as described in claim 9 comprising the further steps of:
    (i) encrypting a block of data D" at said second station using said key derived from key $K'_1$ to generate a message $V_i''$;
    (j) providing the plain text of said block D" at said first station;
    (k) transmitting said message $V_i''$ to said first station;
    (l) decrypting said message $V_i''$ at said first station using said key derived from key $K_1$ to obtain a block of data D'";
    (m) comparing said data D'" and data D" to verify synchronization at said first station.

11. The method of claim 9 wherein said predetermined manner of generating further comprises expanding $K_1$ and $K'_1$ in a predetermined manner at each of said stations, to form identical keys $K_2$ and $K'_2$.

12. The method of claim 11 further comprising modifying $K_2$ and $K'_2$ at each of said stations to generate keys for encryption and decryption of said blocks D and D' by encrypting identical variable data with $K_2$ and $K'_2$.

13. The method of claim 12 wherein said step of encrypting identical variable data comprises encrypting data identifying said first station.

14. Apparatus for generating encryption keys for a sequence of messages comprising:
    (a) means for determining a sequence of N different encryption keys;
    (b) means for associating a value of a sequence variable, $T_i$, with each of said messages; and (c) means for selecting one of said N encryption keys as a function of said variable $T_i$ for each of said messages and encrypting at least a portion of each of said messages in accordance with an encryption key derived in a predetermined manner from the corresponding one of said selected keys; said selecting means further comprising, (d) means for selecting one of said N encryption keys so as to produce results identical to the steps of:

(d1) storing a fixed master key $K_0$;

(d2) storing a permutation table, said table having C columns and N rows, the columns of said table sequentially corresponding to the element positions of key $K_0$, the elements of said table consisting of numbers from 1 to C and (d3) selecting a row $N_i$ of said table in accordance with said variable $T_i$; and (d4) selecting key $K_0$ to derive an encryption key $K_1$, having C elements, by, for all elements of $K_1$, setting the jth element of $K_1$ equal to the yth element of $K_0$, where y is the number at column j row $N_i$ of said permutation table, where j is an integral variable ranging from 1 to C.

15. The apparatus of claim 14 further comprising means for expanding $K_1$ in a predetermined manner to derive an expanded encryption key $K_2$.

16. The apparatus of claim 15 further comprising means for modifying $K_2$ to form an encryption key $K_3$, said modifying means comprising means for encrypting variable data with $K_2$ to generate $K_3$.

17. The apparatus of claim 16 wherein said means for encrypting variable data comprises for encrypting a sequence dependent variable.

18. The apparatus of claim 15 further comprising means for modifying $K_2$ to form an encryption key $K_3$, said modifying means comprising means for encrypting variable data with $K_2$ to generate $K_3$.

19. The apparatus of claim 18 wherein said means for encrypting variable data comprises means for encrypting a sequence dependent variable.

20. The apparatus of claim 14 further comprising means for storing said permutation table in complete form.

* * * * *